United States Patent
Takeda et al.

(10) Patent No.: US 11,864,105 B2
(45) Date of Patent: Jan. 2, 2024

(54) TERMINAL APPARATUS THAT EXECUTES CELL SELECTION IN ACCORDANCE WITH FREQUENCY BAND PRIORITY, CONTROL METHOD FOR SAME, AND COMPUTER-READABLE STORAGE MEDIUM

(71) Applicant: KDDI CORPORATION, Tokyo (JP)

(72) Inventors: Hiroki Takeda, Tokyo (JP); Yanwei Li, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 18/169,981

(22) Filed: Feb. 16, 2023

(65) Prior Publication Data

US 2023/0199640 A1  Jun. 22, 2023

Related U.S. Application Data

(63) Continuation of application No. PCT/JP2021/031781, filed on Aug. 30, 2021.

(30) Foreign Application Priority Data

Sep. 2, 2020 (JP) ................................. 2020-147652

(51) Int. Cl.
*H04W 48/20* (2009.01)
*H04W 48/16* (2009.01)

(52) U.S. Cl.
CPC ........... *H04W 48/20* (2013.01); *H04W 48/16* (2013.01)

(58) Field of Classification Search
CPC .............................. H04W 48/20; H04W 48/16
See application file for complete search history.

(56) References Cited

U.S. PATENT DOCUMENTS

2016/0269953 A1* 9/2016 Jung ..................... H04W 76/14
2017/0094571 A1   3/2017 Yu et al.
(Continued)

FOREIGN PATENT DOCUMENTS

JP  2015-142371 A   8/2015
JP  2016-535513 A  11/2016

OTHER PUBLICATIONS

"36.304 CR to introduce alternative cell reselection priority for EN-DC", 3GPP TSG-RAN WG2 Meeting #109bis-e, R2-2003492, Apr. 20, 2020-Apr. 30, 2020, 4 pages.
(Continued)

*Primary Examiner* — Said M Elnoubi
(74) *Attorney, Agent, or Firm* — Foley & Lardner LLP (57) ABSTRACT

A terminal apparatus acquires, from a base station apparatus, first information indicating a first priority and second information indicating a second priority different from the first priority for when selecting a connection destination cell relating to a plurality of frequency bands, and third information indicating whether the base station apparatus can execute a predetermined function in one or more predetermined frequency bands from among the plurality of frequency bands, and selects a connection destination cell, on a basis of the third information and the predetermined function that can be executed by the terminal apparatus, according to the first priority when the base station apparatus and the terminal apparatus can execute a predetermined function in the predetermined frequency band and according to the second priority when the base station apparatus or the terminal apparatus cannot execute a predetermined function in the predetermined frequency band.

12 Claims, 3 Drawing Sheets

(56) References Cited

U.S. PATENT DOCUMENTS

| | | |
|---|---|---|
| 2020/0053602 A1* | 2/2020 | Kadiri ................ H04W 48/18 |
| 2022/0312354 A1* | 9/2022 | Teyeb ................ H04W 56/002 |
| 2022/0394806 A1* | 12/2022 | Rugeland ............. H04W 76/27 |
| 2023/0115813 A1* | 4/2023 | Sugawara ............. H04W 60/00 |
| | | 455/435.2 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 16)", 3GPP TS 36.304 V16.1.0 (Jul. 2020), Jul. 24, 2020, pp. 24-38, internet<URL: https://www.3gpp.org/ftp/Specs/archive/36_series/36.304/36304-g10.zip> section 5.2.4.1.

"Distributing UEs to multiple carriers", 3 GPP TSG-RAN WG2 #91bis, R2-154623, Huawei, HiSilicon, Oct. 5, 2015-Oct. 9, 2015, https://www.3gpp.org/ftp/tsg_r an/WG2_RL2/TSGR2_91bis/Docs/R2-154623.zip, 4 pages.

\* cited by examiner

TERMINAL APPARATUS THAT EXECUTES CELL SELECTION IN ACCORDANCE WITH FREQUENCY BAND PRIORITY, CONTROL METHOD FOR SAME, AND COMPUTER-READABLE STORAGE MEDIUM

CROSS-REFERENCE TO RELATED APPLICATION(S)

This application is a continuation of International Patent Application No. PCT/JP2021/031781 filed on Aug. 30, 2021, which claims priority to and the benefit of Japanese Patent Application No. 2020-147652 filed on Sep. 2, 2020, the entire disclosures of which are incorporated herein by reference.

BACKGROUND OF THE INVENTION

Field of the Invention

The present invention relates to a technique for controlling cell selection in a cellular communication system.

Description of the Related Art

In a cellular communication system, a terminal apparatus in a non-connected state (for example, in an RRC Idle state) executes cell selection to select a cell as a connection destination when transitioning to a connection state as necessary. In the Third Generation Partnership Project (3GPP) 16 series standard, a technique for selecting a connection destination cell from among a plurality of cell operating in different frequency bands is known.

It is expected that a predetermined function can be used only in a predetermined frequency band. For example, a Long Term Evolution (LTE) base station may be set to use a first frequency band on the condition that it is compatible with EUTRA-NR Dual Connectivity (EN-DC) and to use a second frequency band when it is not compatible with EN-DC. In 3GPP Document, R2-2003492, assuming such a setting, a priority for indicating a frequency band for searching for a connection destination cell to be prioritized is specified for a terminal apparatus compatible with EN-DC.

A terminal apparatus that executes a predetermined function is configured to search for a connection destination cell in a prioritized frequency band on the basis of a specified priority. However, even if the predetermined function can be provided by the base station apparatus in the frequency band, when the terminal apparatus connects to the base station apparatus, the predetermined function may not be able to be executed due to parameter restrictions or the like, for example.

SUMMARY OF THE INVENTION

The present invention provides a technique for enabling a terminal apparatus to appropriately select a connection destination cell according to the function to be executed.

A terminal apparatus according to an aspect of the present invention is a terminal apparatus that executes selection of a connection target cell from among a plurality of cells formed by one or more base station apparatuses, comprising: an acquiring unit configured to acquire, from a base station apparatus, first information indicating a first priority for when selecting a connection destination cell relating to a plurality of frequency bands and second information indicating a second priority different from the first priority for when selecting a connection destination cell relating to the plurality of frequency bands, and to acquire, from the base station apparatus, third information indicating whether the base station apparatus can execute a predetermined function in one or more of predetermined frequency bands from among the plurality of frequency bands; and an executing unit configured to execute selection of a connection destination cell, on a basis of the third information and the predetermined function that can be executed by the terminal apparatus, according to the first priority when the base station apparatus and the terminal apparatus can execute a predetermined function in the predetermined frequency band and according to the second priority when the base station apparatus or the terminal apparatus cannot execute a predetermined function in the predetermined frequency band.

A terminal apparatus according to another aspect of the present invention is a terminal apparatus that executes selection of a connection target cell from among a plurality of cells formed by one or more base station apparatuses, comprising: an acquiring unit configured to acquire, from a base station apparatus, first information indicating priority for when selecting a connection destination cell relating to a plurality of frequency bands; a determining unit configured to make a determination, on a basis of second information indicating whether the one or more base station apparatuses can execute a predetermined function in any one of the plurality of frequency bands, third information indicating a priority for when selecting a connection destination cell relating to the plurality of frequency bands when the predetermined function can be executed by the terminal apparatus, and the predetermined function that the terminal apparatus can execute, whether to select a connection destination cell, in the plurality of frequency bands, according to a first priority indicated by the first information or according to a second priority indicated by the third information; and an executing unit configured to execute selection of a connection destination cell according to the determination.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

System Configuration

Figure 1:
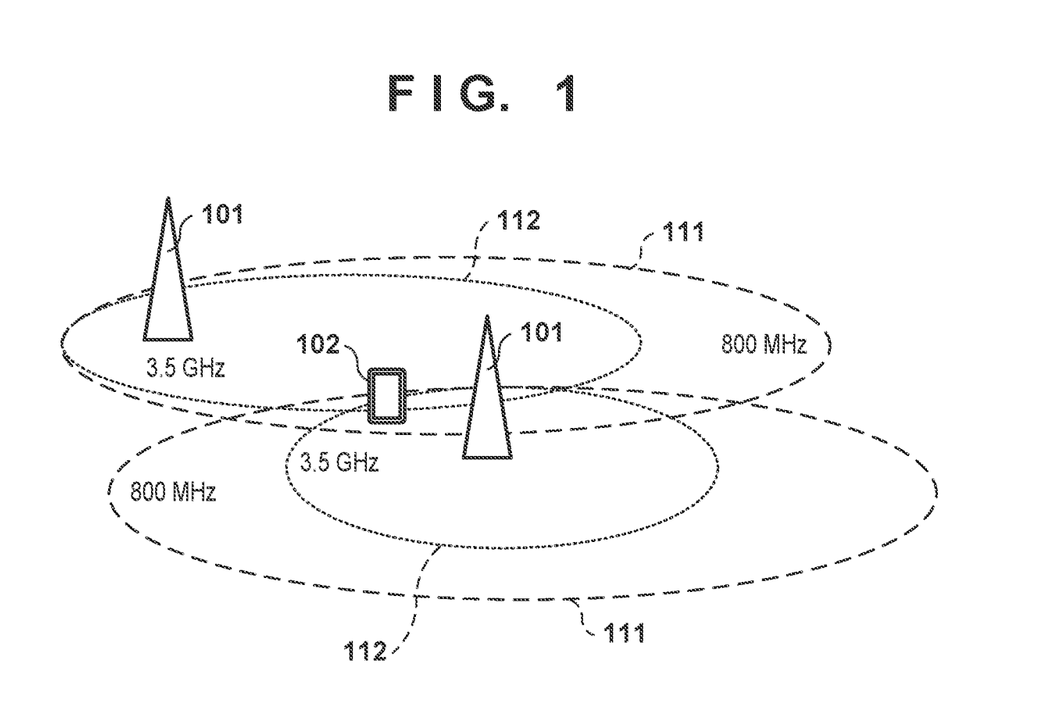
FIG. 1 is a diagram illustrating an example of the configuration of a wireless communication system.

FIG. 1 illustrates an example of the configuration of a wireless communication system according to the present embodiment. The present wireless communication system includes a base station apparatus 101 and a terminal apparatus 102. Note that in FIG. 1, two base station apparatuses 101 and only one terminal apparatus 102 are illustrated, but the number of apparatuses is not limited thereto. In other words, following discussion is also applicable to a wireless communication system including one or more base station apparatuses 101 and one or more terminal apparatuses 102, and the number of apparatuses is not particularly limited.

The base station apparatus 101 is configured to provide a communication service in the 800 MHz band and the 3.5 GHz band, for example. The base station apparatus 101, for example, forms a cell 111 that can provide a communication service in the 800 MHz band and/or forms a cell 112 that can provide a communication service in the 3.5 GHz band and provides a communication service to the terminal apparatus 102 within the range of the cells. Note that this is just an example, and a base station apparatus may exist that can provide a communication service in only the 800 MHz band or only the 3.5 GHz band, and a base station apparatus may exist that can provide a communication service in other frequency bands. In other words, a plurality of cells are formed in the present wireless communication system using a plurality of frequency bands. Thus, one or more base station apparatuses 101 are formed and/or disposed in a manner such that the terminal apparatus 102 can be provided with a communication service using at least one of the plurality of frequency bands.

Note that the base station apparatus 101 may be configured by a communications business operator to execute a communication function in the frequency bands, for example. For example, each base station apparatus 101 may be configured to execute a narrowband communication function in the 800 MHz band and to not execute a narrowband communication function in the 3.5 GHz band. For example, for normal communicating, the 20 MHz frequency bandwidth is used, and for narrowband communication, the 1.4 MHz frequency bandwidth is used. By performing such narrowband communications, power-saving communications can be performed. For example, for narrowband communications, Machine Type Communication (MTC) may be used. In such an application, coverage over a large geographical area is often required. To satisfy this need, for example, the communications business operator may enable a narrowband communication function in the 800 MHz band, wide coverage and not enable a narrowband communication function in the 3.5 GHz band, relatively narrow coverage. In this manner, the wireless communication system may be configured such that whether or not a narrowband communication function can be executed is different for each frequency band. Note that the relationship between a frequency band and whether or not a narrowband communication function can be executed is an example, and in another configuration, a narrowband communication function can be executed in a high frequency band and a narrowband communication function cannot be executed in a low frequency band. Also, the base station apparatus 101 may be configured to execute a narrowband communication function in any of the plurality of usable frequency bands and to not execute a narrowband communication function in the plurality of usable frequency bands.

Also, each of the base station apparatuses 101 may be configured to execute an early measurement reporting function in the 800 MHz band and to not execute an early measurement reporting function in the 3.5 GHz band. Early measurement reporting is a technique for measuring in advance a secondary cell in a standby state prior to the start of communication and increasing the speed to the Carrier Aggregation start-up. The base station apparatus 101 can determine a cell as a secondary cell candidate and can instruct the terminal apparatus 102 that can execute an early measurement report to execute measurement in a frequency band different from the standby frequency band. For example, when the base station apparatus 101 can execute an early measurement report in the 800 MHz band, the base station apparatus 101 can instruct the terminal apparatus 102 to measure in the 3.5 GHz band. As described above, with an early measurement report, the terminal apparatus 102 can be made execute a measurement in a frequency band different from the standby frequency band. Accordingly, for example, the base station apparatus 101 is configured to execute an early measurement report in the 800 MHz band, a low frequency band capable of a relatively wide coverage and is configured to not execute an early measurement report in the 3.5 GHz band, a high frequency band with a tendency to have a relatively narrow coverage. Note that the relationship between a frequency band and whether or not an early measurement report can be executed is an example, and in another configuration, an early measurement report function can be executed in a high frequency band and an early measurement report function cannot be executed in a low frequency band. Also, the base station apparatus 101 may be configured to execute an early measurement report function in any of the plurality of usable frequency bands and to not execute an early measurement report function in the plurality of usable frequency bands.

Also, for the base station apparatus 101, combinations of usable frequency bands may be limited with Dual Connectivity (Multi-RAT Dual Connectivity, MR-DC) across Multi-Radio Access Techniques (RAT) such as EN-DC described above. In a similar manner, the combinations of usable frequency bands may be limited with Dual Connectivity and Carrier Aggregation within one RAT. Accordingly, the base station apparatus 101 may be configured to execute a Dual Connectivity and/or Carrier Aggregation function only for one or more combinations of frequency bands from among the plurality of usable frequency bands.

Furthermore, the base station apparatus 101 may be configured to execute a Multi-Input Multi-Output communication function with different numbers of layers for each frequency band, for example. For example, the base station apparatus 101 may be configured execute a MIMO communication function with a large number of layers in a high frequency band and to execute a MIMO communication function with a small number of layers in a low frequency band. Also, the base station apparatus 101, for example, may be configured to execute a usable network slice, application function, and service function for each frequency band. For example, the base station apparatus 101 may be configured to execute a service function required for a wide-range coverage in only a low frequency band and to execute a service function where local coverage is fine in only a high frequency band. Note that the functions described above are examples, and the base station apparatus 101 may be configured in a manner to be set to execute or not for each frequency band or to have different executable contents for each frequency band.

Note that for example, the base station apparatus 101 at least within a certain range is configured to execute a predetermined function in a common frequency band. In other words, a communications business operator may configure the base station apparatus 101 so that, within a certain range, a predetermined function can be provided to the terminal apparatus 102 by the terminal apparatus 102 using one frequency band.

The terminal apparatus 102 is configured to support communications in at least one frequency band from among the plurality of frequency bands including 800 MHz band and 3.5 GHz band, for example. Also, for example, the terminal apparatus 102 may be configured to execute functions including narrowband communication, early measurement reporting, Dual Connectivity, Carrier Aggregation, and the like. Note that the terminal apparatus 102 may be configured to execute functions other than these example functions. Also, the terminal apparatus 102 may be able to execute all of these example functions or may be able to execute one or more of these example functions. In such a case, the terminal apparatus 102 does not need to be able to execute all of these example functions. Note that when the terminal apparatus 102 can use a plurality of frequency bands, the terminal apparatus 102 may be configured to execute a predetermined function in only one or more (for example, one) of the frequency bands. For example, when the terminal apparatus 102 can use the 800 MHz band and the 3.5 GHz band, the terminal apparatus 102 may be configured to execute narrowband communication in only the 800 MHz band.

As described above, the base station apparatus 101 may be installed with different functions for the plurality of usable frequency bands. For example, the base station apparatus 101 may be configured to execute narrowband communication in the 800 MHz band and configured to not execute narrowband communication in the 3.5 GHz band. Conversely, the base station apparatus 101 may be configured to not execute narrowband communication in the 800 MHz band and configured to execute narrowband communication in the 3.5 GHz band. Also, for example, the base station apparatus 101 may be configured to execute narrowband communication in both the 800 MHz band and the 3.5 GHz band or may be configured to not execute narrowband communication in both. The same can also be said about an early measurement report. In other words, the base station apparatus 101 may be configured to execute a predetermined function in one or more or all of the plurality of usable frequency bands or may be configured to not execute the predetermined function in any of the plurality of frequency bands. In a similar manner, the terminal apparatus 102 may be configured to execute a predetermined function in one or more or all of the one or more usable frequency bands or may be configured to not execute the predetermined function in any of the one or more frequency bands.

Regarding the plurality of frequency bands usable by the base station apparatus 101, the terminal apparatus 102 can acquire information indicating the priority for when the terminal apparatus 102 selects a connection destination cell and can select a connection destination cell on the basis of the priority. For example, the terminal apparatus 102 may internally acquire information indicating a priority registered in advance inside the apparatus or in a Subscribed Identity Module (SIM) or the like or may acquire information indicating a priority from a network upon position registration or the like. Also, the base station apparatus 101 may, for example, send a notification signal including information indicating a priority, and the terminal apparatus 102 may acquire the information indicating the priority by receiving the notification signal. The terminal apparatus 102 may execute selection of a cell to connect to when a connected state (for example, an RRC Connected state) is transitioned to using the frequency band selected on the basis of the priority. Then, the terminal apparatus 102 transitions to a connected state as necessary and attempts to execute communication to execute the predetermined function.

However, the frequency band prioritized in cell selection may not necessarily be a frequency band in which the predetermined function can be executed. For example, the base station apparatus 101 may be unable to execute the predetermined function in the frequency band used by the cell selected by the terminal apparatus 102. In a similar manner, the terminal apparatus 102 may be unable to execute the predetermined function in the selected frequency band. In this case, the terminal apparatus 102 establishes a connection in the cell selected for when establishing a connection, but the predetermined function cannot be executed in that cell. The terminal apparatus 102 may execute the predetermined function by performing a handover to a cell using a different frequency band, for example, but the handover may cause unnecessary signaling and may increase the time taken until execution of the predetermined function is started.

In the present embodiment, in light of such circumstances, information relating to a function that the base station apparatus 101 can execute in a usable frequency band is acquired by the terminal apparatus 102. Also, the terminal apparatus 102 determines whether the base station apparatus 101 can execute a predetermined function in that frequency band and determines, on the basis of the determination result, whether to execute cell selection according to a first priority unchanged from the priority acquired as described above or to execute cell selection according to a second priority changed from the priority acquired as described above.

For example, the terminal apparatus 102 may acquire information indicating whether or not the base station apparatus 101 can execute the predetermined function in one predetermined frequency band from among the plurality of frequency bands usable by the base station apparatus 101 from each of the one or more base station apparatuses 101. For example, the base station apparatus 101 may form a plurality of cells corresponding to a plurality of frequency bands. Also, for each cell, the base station apparatus 101 may provide information indicating whether the predetermined function can be executed using the one frequency band used when forming the cell. In this case, for each one of the plurality of cells formed by the base station apparatus 101, the terminal apparatus 102 may acquire information indicating whether the predetermined function can be executed in the corresponding frequency band. Note that by acquiring information for the cells corresponding to the plurality of frequency bands, information indicating whether the predetermined function can be executed in each one of the plurality of frequency bands may be acquired by the terminal apparatus 102. Also, the base station apparatus 101 may transmit only information indicating whether the predetermined function can be executed in one frequency band determined in advance (one with the highest priority, for example). In other words, the base station apparatus 101 may transmit the same information to all of the formed cells.

Note that in the present embodiment and the scope of the claims, the term "cell" includes "beam" in its meaning. Also, the predetermined function may be a narrowband communication or early measurement report as described above, for example.

Here in a first example, the base station apparatus 101 can use the 800 MHz band and the 3.5 GHz band, and the 3.5 GHz band is set with a higher priority than the 800 MHz band for traffic offloading, for example. Also, whether or not the predetermined function can be executed in the 3.5 GHz band by the base station apparatus 101 is reported.

At this time, that the predetermined function cannot be executed in the 3.5 GHz band by the base station apparatus 101 has been reported. At this time, if the terminal apparatus 102 can execute the predetermined function in the 800 MHz band, the terminal apparatus 102 changes the priority so that the cell selection is executed with the 800 MHz band prioritized. In other words, at this time, the terminal apparatus 102 cannot recognize whether or not the predetermined function can be executed in the 800 MHz band by the base station apparatus 101 but prioritizes the 800 MHz band because there is a possibility that the predetermined function can be executed in the 800 MHz band. On the other hand, if the terminal apparatus 102 cannot execute the predetermined in the 800 MHz band, because the predetermined function cannot be executed in the 800 MHz band even after waiting, the terminal apparatus 102 does not change the priority from the priority acquired in advance and executes cell selection prioritizing the 3.5 GHz band.

A case in which it has been reported that the predetermined function can be executed in the 3.5 GHz band by the base station apparatus 101 will now be described. When the terminal apparatus 102 can execute the predetermined function in the 3.5 GHz band, because the predetermined function can be executed in the 3.5 GHz band, the terminal apparatus 102 does not change the priority from the priority acquired in advance and executes cell selection prioritizing the 3.5 GHz band. When the terminal apparatus 102 cannot execute the predetermined function in the 3.5 GHz band but can execute the predetermined function in the 800 MHz band, the terminal apparatus 102 changes the priority so that the cell selection is executed prioritizing the 800 MHz band. This is because in some cases, the terminal apparatus 102 cannot execute the predetermined function in the 3.5 GHz band but can execute the predetermined function in the 800 MHz band. In other words, at this time, the terminal apparatus 102 cannot recognize whether or not the predetermined function can be executed in the 800 MHz band by the base station apparatus 101 but executes cell selection prioritizing the 800 MHz band because there is a possibility that the predetermined function can be executed in the 800 MHz band. Note that when the terminal apparatus 102 cannot execute the predetermined function in the 3.5 GHz band and cannot execute the predetermined function in the 800 MHz band, the terminal apparatus 102 does not change the priority and executes cell selection in the 3.5 GHz band. This is because there is no advantage in changing the priority if the predetermined function cannot be executed by the terminal apparatus 102 in the 800 MHz band even after waiting.

Next, a second example in which whether or not the predetermined function can be executed in the 800 MHz band by the base station apparatus 101 has been reported will now be described. Note that in the present example also, the base station apparatus 101 can use the 800 MHz band and the 3.5 GHz band, and the 3.5 GHz band is set with a higher priority than the 800 MHz band for traffic offloading, for example.

That the predetermined function cannot be executed in the 800 MHz band by the base station apparatus 101 has been reported. At this time, if the terminal apparatus 102 can execute the predetermined function in the 3.5 GHz band, the terminal apparatus 102 uses the acquired priority as is so that the cell selection is executed with the 3.5 GHz band prioritized. In other words, at this time, the terminal apparatus 102 cannot recognize whether or not the predetermined function can be executed in the 3.5 GHz band by the base station apparatus 101 but prioritizes the 3.5 GHz band because there is a possibility that the predetermined function can be executed in the 3.5 GHz band. On the other hand, if the terminal apparatus 102 cannot execute the predetermined in the 3.5 GHz band, because the predetermined function cannot be executed in the 800 MHz band even after waiting, the terminal apparatus 102 does not change the priority from the priority acquired in advance and executes cell selection prioritizing the 3.5 GHz band.

A case in which it has been reported that the predetermined function can be executed in the 800 MHz band by the base station apparatus 101 will now be described. At this time, if the terminal apparatus 102 can execute the predetermined function in both the 800 MHz band and the 3.5 GHz band, because the terminal apparatus 102 can execute the predetermined function in the 800 MHz band, the terminal apparatus 102 changes the priority so that the cell selection is executed with the 800 MHz band prioritized. Also, when the terminal apparatus 102 cannot execute the predetermined function in the 3.5 GHz band but can execute the predetermined function in the 800 MHz band, the terminal apparatus 102 changes the priority so that the cell selection is executed prioritizing the 800 MHz band. This is because in some cases, the terminal apparatus 102 cannot execute the predetermined function in the 3.5 GHz band but can execute the predetermined function in the 800 MHz band. On the other hand, when the terminal apparatus 102 cannot execute the predetermined function in the 800 MHz band but can execute the predetermined function in the 3.5 GHz band, because there is a possibility that the predetermined function can be executed in the 3.5 GHz band, the terminal apparatus 102 does not change the priority from the priority acquired in advance and executes cell selection prioritizing the 3.5 GHz band. Also, when the terminal apparatus 102 cannot execute the predetermined function in the 3.5 GHz band and cannot execute the predetermined function in the 800 MHz band, the terminal apparatus 102 does not change the priority and executes cell selection in the 3.5 GHz band. This is because there is no advantage in changing the priority if the predetermined function cannot be executed by the terminal apparatus 102 in the 800 MHz band even after waiting.

Next, a third example in which whether or not the predetermined function can be executed in either the 800 MHz band or the 3.5 GHz band by the base station apparatus 101 has been reported will now be described. Note that in the present example also, the base station apparatus 101 can use the 800 MHz band and the 3.5 GHz band, and the 3.5 GHz band is set with a higher priority than the 800 MHz band for traffic offloading, for example. In other words, in the present example, the base station apparatus 101 reports information indicating whether or not the predetermined function can be executed in either of the usable frequency bands to the terminal apparatus 102. Note that the base station apparatus 101 may report this information for each one of the plurality of frequency bands or may report this information for one of the frequency bands from among the plurality of frequency bands.

The terminal apparatus 102 determines whether the predetermined function can be executed with the base station apparatus 101 in either the 800 MHz band or the 3.5 GHz band on the basis of the information reported by the base station apparatus 101 and the frequency band the terminal apparatus 102 can used to execute the predetermined function. In other words, the terminal apparatus 102 (1) determines that the predetermined function can be execute in the 3.5 GHz band when the base station apparatus 101 and the terminal apparatus 102 both can execute the predetermined function in the 3.5 GHz band, (2) determines that the predetermined function can be executed in the 800 MHz band when the base station apparatus 101 and the terminal apparatus 102 both can execute the predetermined function in the 800 MHz band, (3) determines that the predetermined function cannot be executed in the 3.5 GHz band when either one of the base station apparatus 101 or the terminal apparatus 102 cannot execute the predetermined function in the 3.5 GHz band, and (4) determines that the predetermined function cannot be executed in the 800 MHz band when either one of the base station apparatus 101 and the terminal apparatus 102 cannot execute the predetermined function in the 800 MHz band. When the terminal apparatus 102 determines that the predetermined function can be executed in the 3.5 GHz band, the priority is not changed and cell selection is executed in the 3.5 GHz band. In other words, when the predetermined function can be executed in the 3.5 GHz band, which has a high priority, irrespective of whether or not the predetermined function can be executed in the 800 MHz band, the priority is not changed. On the other hand, when the terminal apparatus 102 determines that the predetermined function cannot be executed in the 3.5 GHz band but the predetermined function can be executed in the 800 MHz band, the terminal apparatus 102 changes the priority so that the cell selection is executed in the 800 MHz band. Also, when the predetermined function cannot be executed in neither the 3.5 GHz band nor the 800 MHz band, the terminal apparatus 102 executes the cell selection in the 3.5 GHz band without changing the priority.

Note that, for a predetermined function that uses a combination of a plurality of frequency bands, for example, the base station apparatus 101 may report information indicating which combinations of frequency bands can be used to execute the predetermined function to the terminal apparatus 102. For example, information relating to a combination of frequency bands that can be used for Carrier Aggregation or (Single-RAT or Multi-RAT) Dual Connectivity is reported to the terminal apparatus 102 by each one of the one or more base station apparatuses 101. For example, the information reported may include that the base station apparatus 101 can execute the predetermined function described above using a combination of the 700 MHz band and the 3.5 GHz band but the predetermined function cannot be executed using a combination of the 800 MHz band and the 3.5 GHz band. At this time, when the terminal apparatus 102 can execute the predetermined function using a combination of the 800 MHz band and the 3.5 GHz band but cannot execute the predetermined function using a combination of the 700 MHz band and the 3.5 GHz band, because the terminal apparatus 102 cannot execute the predetermined function with the base station apparatus 101, the terminal apparatus 102 may determine the frequency band to use to execute the cell selection on the basis of the priority acquired in advance. On the other hand, when the terminal apparatus 102 can execute the predetermined function using a combination of the 700 MHz band and the 3.5 GHz band but, for example, the information acquired in advance indicates that the 800 MHz band has high priority, the terminal apparatus 102 may change the priority and execute the cell selection prioritizing the 700 MHz band and the 3.5 GHz band.

Also, the base station apparatus 101 may report information relating to the communication capability in each one of the plurality of usable frequency bands, for example. For example, the base station apparatus 101 may report the maximum number of layers of the MIMO able to be set for each frequency band. The terminal apparatus 102 may determine whether or not to change the priority so that the cell selection can be executed in a frequency band that can achieve the maximum number of layers on the basis of the number of layers of the MIMO able to be set for each frequency band usable by the terminal apparatus 102 and the reported information.

Also, for each frequency band, the base station apparatus 101 may report information relating to an executable network slice, application function, and service function. The terminal apparatus 102 may determine whether or not to change the priority when executing the cell selection so that a frequency band, from among the frequency bands usable by the terminal apparatus 102, which can execute a predetermined network slice, application function, and service function can be selected. At this time, the network slice, application function, and service function may be identified by a network slice identifier, such as a Single Network Slice Selection Assistance Information (S-NSSAI), a Slice/Service type (SST), a Slice Differentiator (SD), and the like. Also, instead of the base station apparatus, a core network apparatus may report the network slice, application function, and service function executable in each frequency band.

Also, for example, an early measurement report, as described above, is a function for measuring in advance a secondary cell prior to the start of communication, and the base station apparatus 101 may report information indicating a measurable frequency band as the secondary cell candidate. For example, the base station apparatus 101 may report information indicating that an early measurement report can be executed in the 3.5 GHz band to the terminal apparatus 102 as well as reporting at this time that the frequency band able to be used for measurement instruction is the 800 MHz band. Also, when the terminal apparatus 102 supports an early measurement report function in the 3.5 GHz band and the frequency band able to be used for measurement while in standby for the 3.5 GHz band is the 800 MHz band, the terminal apparatus 102 may determine that an early measurement report can be executed in the 3.5 GHz band. On the other hand, for example, when the frequency band able to be used for measurement while in standby for the 3.5 GHz band is the 700 MHz band and the 800 MHz band cannot be used for measurement, the terminal apparatus 102 may determine that an early measurement report cannot be executed in the 3.5 GHz band. Also, the terminal apparatus 102 may determine whether or not to change the priority on the basis of the determination result.

Note that information relating to post-change priorities to be used by the terminal apparatus 102 when changing the priority may be reported by the base station apparatus 101 to the terminal apparatus 102. In other words, the terminal apparatus 102 may acquire information relating to a plurality of priorities and determine which priority to use as described above. Note that post-change priorities may be set so that, for example, the frequency bands that can be used to execute the predetermined function have the highest priority, frequency bands that have a possibility of being able to execute the predetermined function have the next highest priority, and frequency bands that cannot be used to execute the predetermined function have the lowest priority. Note that when the predetermined function can be executed in a plurality of frequency bands, the post-change priorities may be set so that, from among the frequency bands, the frequency bands with the highest priority before priority change have the highest priority.

Apparatus Configuration

Figure 2:
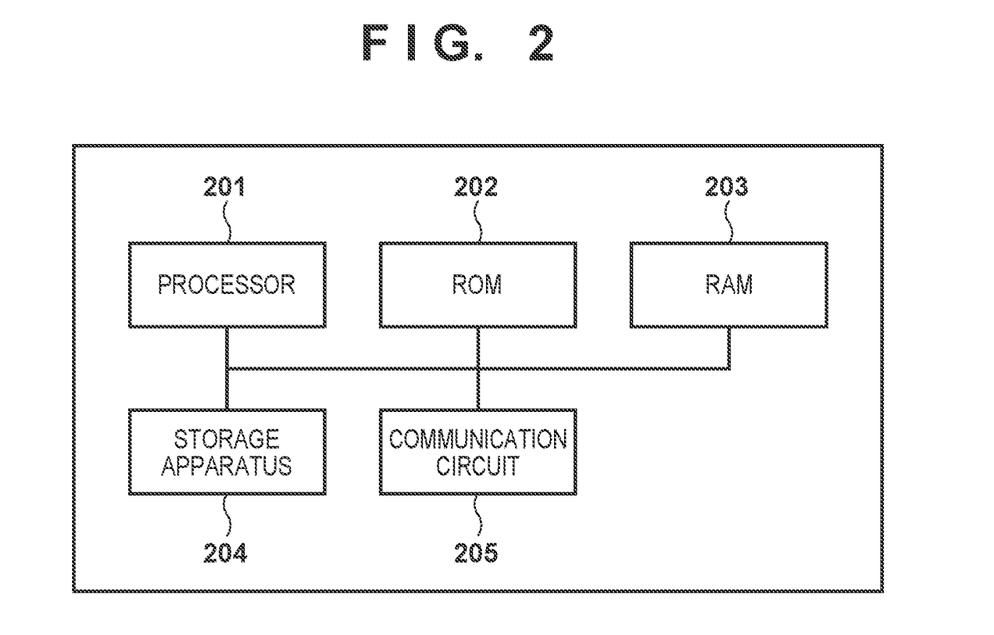
FIG. 2 is a diagram illustrating an example of the hardware configuration a terminal apparatus.

Next, an example of the hardware configuration of the terminal apparatus 102 that executes the processing described above will be described using FIG. 2. The terminal apparatus 102 includes, for example, a processor 201, ROM 202, RAM 203, a storage apparatus 204, and a communication circuit 205. The processor 201 is a computer, such as a general-purpose central processing unit (CPU), an application specific integrated circuit (ASIC), or the like, including one or more processing circuits. By the processor 201 reading out and executing a program stored in the ROM 202 and the storage apparatus 204, the processing of the entire terminal apparatus 102 and the processing described above are executed. The ROM 202 is read-only memory that stores information, such as a program relating to processing executed by the terminal apparatus 102, various parameters, and the like. The RAM 203 is random-access memory that functions as a work space when the processor 201 executes a program and temporary stores information. The storage apparatus 204 is constituted by a detachable external storage device, for example. The communication circuit 205 is constituted by a circuit for LTE or 5G wireless communication, for example. Note that in FIG. 2, only a single communication circuit 205 is illustrated, but the terminal apparatus 102 may include a plurality of communication circuits (for LTE or for 5G, for example). Note that the terminal apparatus 102 may include separate communication circuits 205 for the plurality of usable frequency bands or may include common communication circuits 205 shared by two or more of the frequency bands. Also, the terminal apparatus 102 may include not only the communication circuit 205 for cellular communication but also the communication circuit 205 compatible with another wireless communication standard such as wireless LAN.

Figure 3:
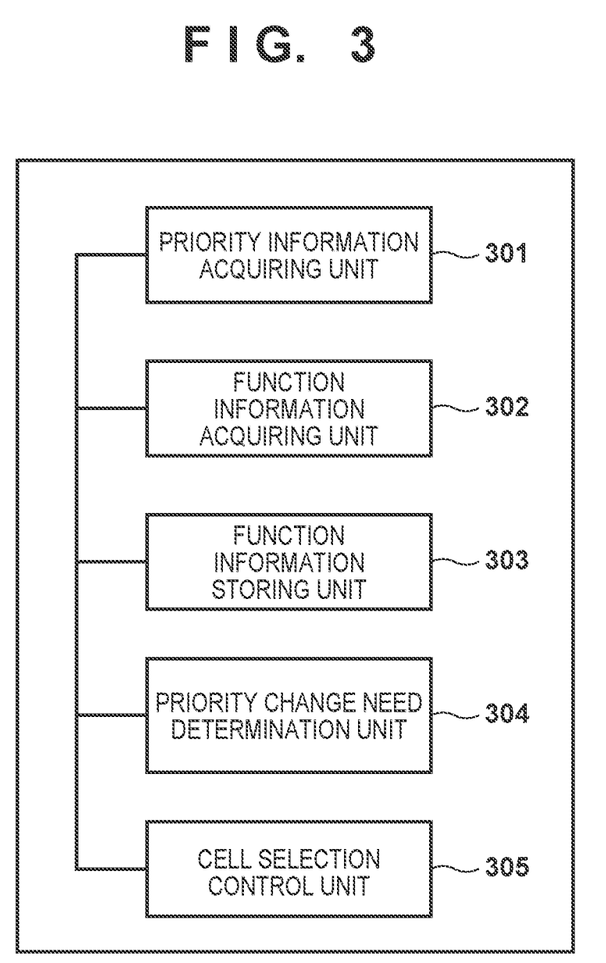
FIG. 3 is a diagram illustrating an example of the functional configuration of the terminal apparatus.

FIG. 3 is a diagram illustrating an example of the functional configuration of the terminal apparatus 102. The terminal apparatus 102, as a functional configuration, includes a priority information acquiring unit 301, a function information acquiring unit 302, a function information storing unit 303, a priority change need determination unit 304, and a cell selection control unit 305. Note that in FIG. 3, only the functions relating specifically to the present embodiment are illustrated, and various other functions that another terminal apparatus 102 may include are omitted from the diagram. For example, the terminal apparatus 102 naturally includes other functions typically included in a terminal apparatus in a cellular communication system. Also, the functional blocks in FIG. 3 are schematically illustrated, and the functional blocks may be integrally formed or may be subdivided when implemented. Also, the functions in FIG. 3 may be implemented by the processor 201 executing a program stored in the ROM 202 or the storage apparatus 204 or may be implemented by a processor inside the communication circuit 205 executing a predetermined piece of software, for example.

The priority information acquiring unit 301 acquires first information indicating the priority for when the terminal apparatus 102 selects a connection destination cell relating to the plurality of frequency bands usable in wireless communication. Note that the priority information acquiring unit 301 may acquire, in addition to the information indicating the first priority to be used in normal operation (for example, when not executing the predetermined function), information indicating the second priority to be used when priority is changed from the first priority. Note that, the priority information acquiring unit 301 may acquire information relating to the priority stored internally in advance by reading out the information or may acquire the information from the base station apparatus 101 within the surroundings. For example, the priority information acquiring unit 301 acquires and stores in advance information from the base station apparatus that is the connection destination just before entering the connected state and reads out the stored information when in the standby state. In this manner, information can be acquired from a base station apparatus other than the base station apparatus 101 forming the cell which is the target for selection. Also, information relating to priority set by the communications business operator in advance may be registered in advance on a SIM or the like, and, in this case, information may be acquired without communicating, for example.

The function information acquiring unit 302 acquires, from each one of the one or more base station apparatuses 101 in the surroundings, second information indicating whether each one of the one or more base station apparatuses 101 can execute the predetermined function in one predetermined frequency band from among the plurality of frequency bands usable in the wireless communication described above. Also, the function information acquiring unit 302 may acquire, from each one of the one or more base station apparatuses 101 in the surroundings, the second information indicating whether each one of the one or more base station apparatuses 101 can execute the predetermined function in each one of the usable frequency bands. The function information storing unit 303 stores information enabling identification of a frequency band that can be used by the terminal apparatus 102 to execute the predetermined function from among the one or more frequency bands usable in the wireless communication. The function information storing unit 303, for example, may store information based on a contract made with the communications business operator of the terminal apparatus 102. Note that the predetermined function may include, for example, narrowband communication, early measurement report, (single-RAT or multi-RAT) Dual Connectivity, Carrier Aggregation, and the like, as described above. Note that information relating to the executable communication capability such as the number of layers of the MIMO may be treated as information relating to whether the predetermined function is executable. Also, information relating to an executable network slice, application function, and service function may be treated as information relating to whether the predetermined function is executable.

The priority change need determination unit 304 determines whether or not to change the priority (the first priority described above) indicated by the first information on the basis of the second information described above acquired by the function information acquiring unit 302 and the information stored by the function information storing unit 303. An example of the determination processing executed by the priority change need determination unit 304 is as described above, and as such the description is not repeated.

The cell selection control unit 305 executes cell selection using the priority determined on the basis of the result of the determination by the priority change need determination unit

304. For example, when the priority change need determination unit 304 determines not to change the priority, the cell selection control unit 305 executes cell selection according to the first priority described above acquired by the priority information acquiring unit 301. On the other hand, when the priority change need determination unit 304 determines to change the priority, the cell selection control unit 305 executes cell selection according to the second priority changed from the first priority described above. Note that the second priority, as described above, may be acquired by the priority information acquiring unit 301 or may be determined by the cell selection control unit 305 and the priority change need determination unit 304 on the basis of the frequency band that can be used to execute the predetermined function by each one of the one or more base station apparatuses 101, the frequency band that can be used to execute the predetermined function by the terminal apparatus 102, and the pre-change priority.

Processing Flow

Figure 4:
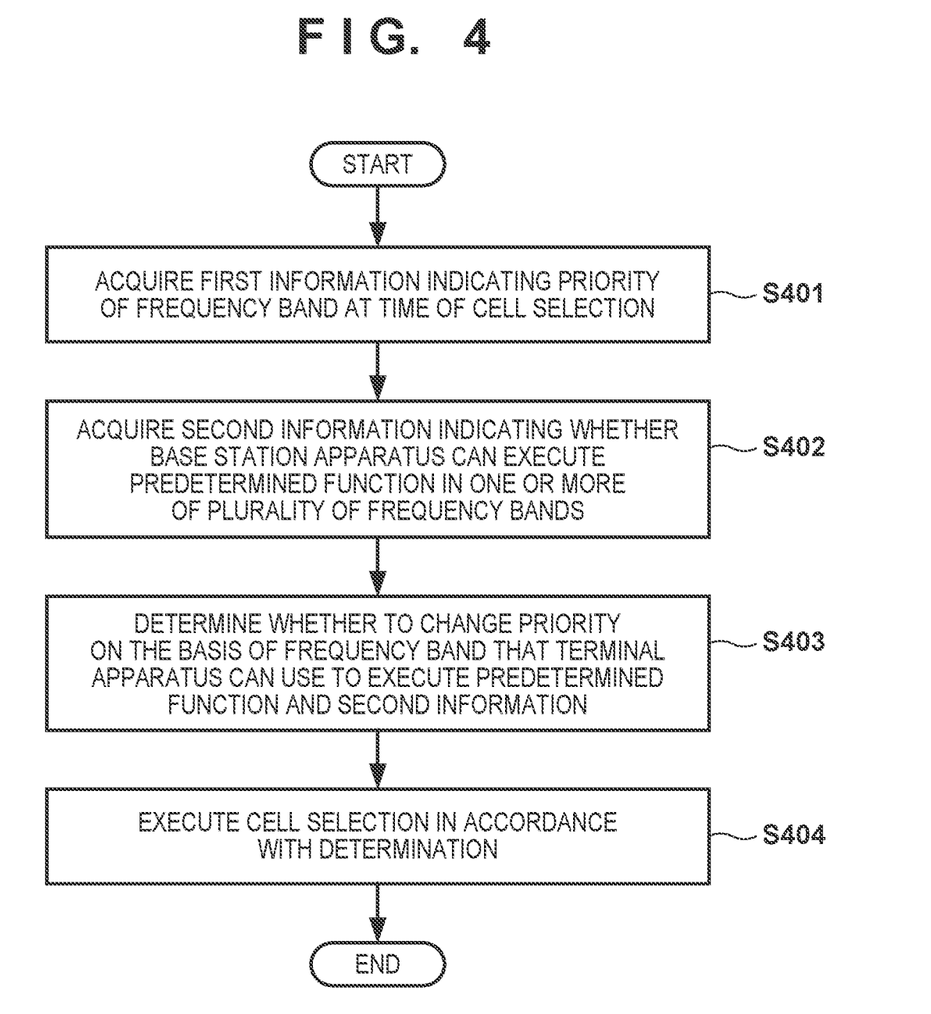
FIG. 4 is a diagram for giving an overview of the flow of the processing executed by the terminal apparatus.

Next, the flow of the processing executed by the terminal apparatus 102 will be described using FIG. 4. Note that the present processing is an example, and the order of two or more processes may be switched, or processes may be executed at the same time. Also, one or more processes may be omitted or modified. Note that the present processing may be implemented by the processor 201 executing a program stored in the ROM 202 or the storage apparatus 204 or may be implemented by a processor inside the communication circuit 205 executing a predetermined piece of software, for example. Note that the contents of the processing are as described above, and thus only an overview of the processing flow will be given below, with the details being omitted.

The terminal apparatus 102 first acquires the first information indicating the priority for when the terminal apparatus 102 selects a connection destination cell relating to the plurality of frequency bands usable in wireless communication (step S401). Note that the processing may be executed as internal processing of the terminal apparatus 102 or may be executed as processing by the terminal apparatus 102 to acquire from the base station apparatus 101 or the like. Also, the terminal apparatus 102 acquires, from each one of the one or more base station apparatuses 101 in the surroundings, the second information indicating whether each one of the one or more base station apparatuses 101 can execute the predetermined function in one or a plurality (for example, all) of frequency bands from among the plurality of usable frequency bands (step S402). Then, on the basis of the frequency band that can be used by the terminal apparatus 102 to execute the predetermined function and the second information acquired in step S402, the terminal apparatus 102 determines whether to execute cell selection according the first priority unchanged from the priority acquired in step S401 or to execute cell selection according to the second priority changed from the priority acquired in step S401 (step S403) and executes cell selection according to the result of the determination in step S403 (step S404).

According to the processing described above, the terminal apparatus 102 can appropriately determine the frequency band to focus on and prioritize for cell selection on the basis of the frequency band that can be used by the base station apparatus 101 in the surroundings to execute the predetermined function and the frequency band that can be used by the terminal apparatus 102 to execute the predetermined function and can appropriately select the connection destination cell.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A terminal apparatus that executes selection of a connection target cell from among a plurality of cells formed by one or more base station apparatuses, comprising:
   one or more processors; and
   one or more memories that stores a computer-readable instruction for causing, when executed by the one or more processors, the one or more processors to function as:
   an acquiring unit configured to acquire, from a base station apparatus, first information indicating priority for when selecting a connection destination cell relating to a plurality of frequency bands;
   a determining unit configured to make a determination, on a basis of second information indicating whether the one or more base station apparatuses can execute a predetermined function in any one of the plurality of frequency bands, third information indicating a priority for when selecting a connection destination cell relating to the plurality of frequency bands when the predetermined function can be executed by the terminal apparatus, and the predetermined function that the terminal apparatus can execute, whether to select a connection destination cell, in the plurality of frequency bands, according to a first priority indicated by the first information or according to a second priority indicated by the third information; and
   an executing unit configured to execute selection of a connection destination cell according to the determination, and
   wherein the determining unit determines to select a connection destination cell according to the first priority when no frequency band is indicated by the second information to be able to be used to execute the predetermined function.

2. The terminal apparatus according to claim 1, wherein the determining unit determines to select a connection destination cell according to the second priority when a first frequency band indicated by the second information to be able to be used to execute the predetermined function is a frequency band indicated by the first information to not be prioritized,
the terminal apparatus can execute the predetermined function in the first frequency band, and
the second information indicates that the predetermined function cannot be executed in a second frequency band indicated by the first information that have a higher priority than the first frequency band.

3. The terminal apparatus according to claim 1, wherein the determining unit determines to select a connection destination cell according to the second priority when a first frequency band indicated by the second information to be able to be used to execute the predetermined function is a frequency band indicated by the first information to not be prioritized,
the terminal apparatus can execute the predetermined function in the first frequency band, and
the predetermined function cannot be executed by the terminal apparatus in a second frequency band indicated by the first information to have a higher priority than the first frequency band.

4. The terminal apparatus according to claim 1, wherein
the determining unit determines to select a connection destination cell according to the first priority when a frequency band that can be used by the terminal apparatus to execute the predetermined function is not included in a frequency band indicated by the second information to be able to be used to execute the predetermined function.

5. The terminal apparatus according to claim 1, wherein
the predetermined function is a Carrier Aggregation or Dual Connectivity function,
the second information indicates a combination of frequency bands that can be used to execute the predetermined function, and
the determining unit determines to select a connection destination cell according to either the first priority or the second priority on a basis of whether the predetermined function can be executed by the terminal apparatus using a combination of frequency bands indicated by the second information.

6. The terminal apparatus according to claim 1, wherein
the predetermined function is a Multi-Radio Access Technology (RAT) Dual Connectivity function,
the second information indicates a combination of a first RAT frequency band and a second RAT frequency band that can be used to execute the predetermined function, and
the determining unit determines to select a connection destination cell according to either the first priority or the second priority on a basis of whether the predetermined function can be executed by the terminal apparatus using the combination of the first RAT frequency band and the second RAT frequency band indicated by the second information.

7. The terminal apparatus according to claim 1, wherein
the acquiring unit is further configured to acquire the second information from the one or more base station apparatuses.

8. The terminal apparatus according to claim 1, wherein
the predetermined function is a narrowband communication function.

9. The terminal apparatus according to claim 1, wherein
the predetermined function is an early measurement report function.

10. The terminal apparatus according to claim 1, wherein
the predetermined function is a function for implementing a network slice identified by Single Network Slice Selection Assistance Information (S-NSSAI), Slice/Service type (SST), or Slice Differentiator (SD).

11. A control method executed by a terminal apparatus that executes selection of a connection target cell from among a plurality of cells formed by one or more base station apparatuses, comprising:

acquiring, from a base station apparatus, first information indicating priority for when selecting a connection destination cell relating to a plurality of frequency bands;

determining, on a basis of second information indicating whether the one or more base station apparatuses can execute a predetermined function in any one of the plurality of frequency bands, third information indicating a priority for when selecting a connection destination cell relating to the plurality of frequency bands when the predetermined function can be executed by the terminal apparatus, and the predetermined function that the terminal apparatus can execute, whether to select a connection destination cell, in the plurality of frequency bands, according to a first priority indicated by the first information or according to a second priority indicated by the third information; and executing selection of a connection destination cell according to the determining, and wherein it is determined in the determining to select a connection destination cell according to the first priority when no frequency band is indicated by the second information to be able to be used to execute the predetermined function.

12. A non-transitory computer-readable storage medium that stores a program that causes a computer provided in a terminal apparatus that executes selection of a connection target cell from among a plurality of cells formed by one or more base station apparatuses to:

acquire, from a base station apparatus, first information indicating priority for when selecting a connection destination cell relating to a plurality of frequency bands;

make, on a basis of second information indicating whether the one or more base station apparatuses can execute a predetermined function in any one of the plurality of frequency bands, third information indicating a priority for when selecting a connection destination cell relating to the plurality of frequency bands when the predetermined function can be executed by the terminal apparatus, and the predetermined function that the terminal apparatus can execute, a determination of whether to select a connection destination cell, in the plurality of frequency bands, according to the first priority indicated by the first information or according to the second priority indicated by the third information; and execute selection of a connection destination cell according to the determining, and wherein it is determined in the determination to select a connection destination cell according to the first priority when no frequency band is indicated by the second information to be able to be used to execute the predetermined function.

* * * * *